July 25, 1961    F. H. TOWLER ET AL    2,993,505
RELIEF VALVE
Filed May 17, 1954    2 Sheets-Sheet 1
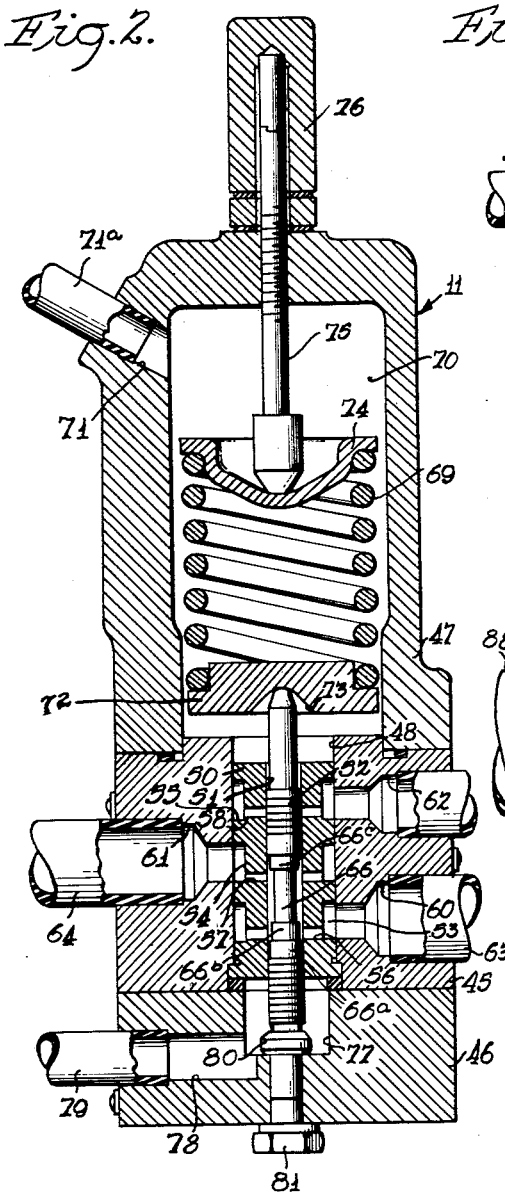
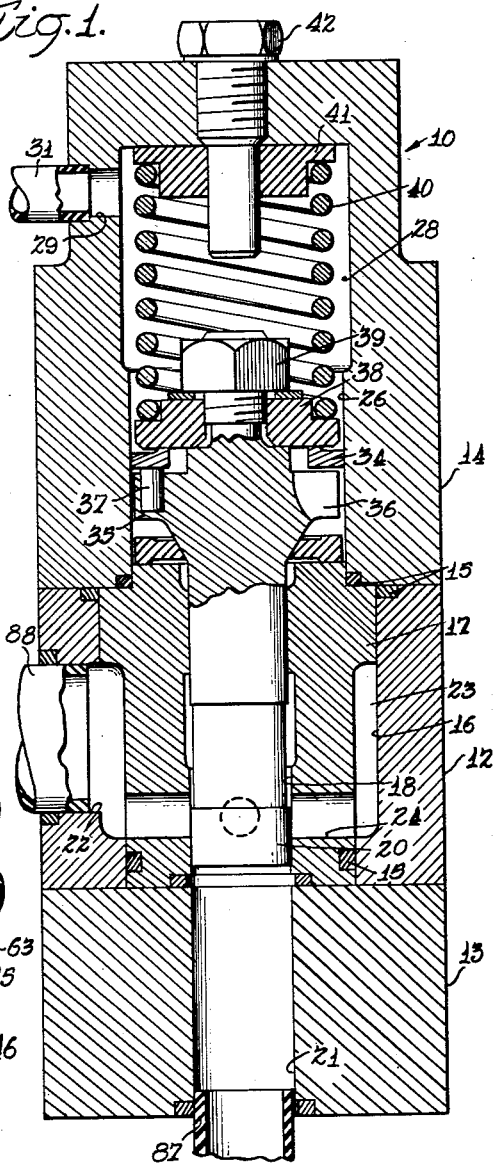
Inventors
Frank Hathorn Towler
John Maurice Towler
By Carlson, Pitzner, Hubbard & Wolfe
Atty's

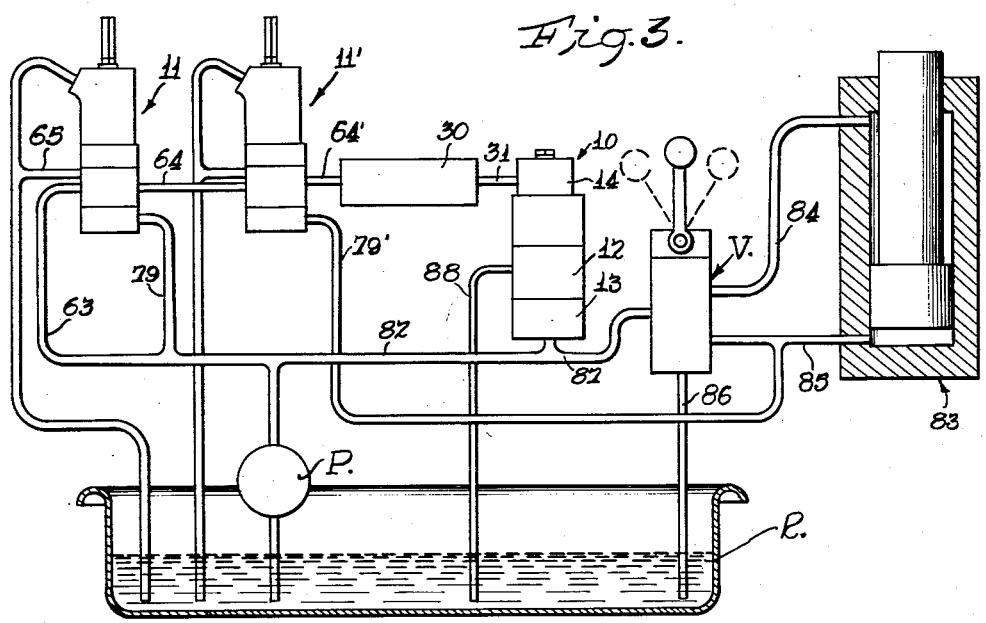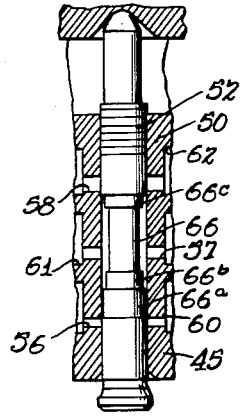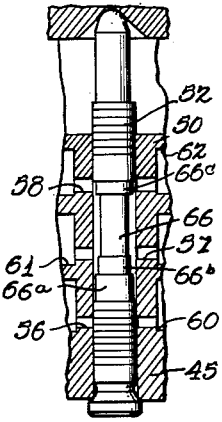

United States Patent Office 2,993,505  
Patented July 25, 1961

2,993,505  
RELIEF VALVE  
Frank Hathorn Towler, Dob Park, near Otley, and John Maurice Towler, Mayfair, London, England, assignors to Electraulic Presses Limited, Rodley, near Leeds, England, a limited company of England  
Filed May 17, 1954, Ser. No. 430,339  
Claims priority, application Great Britain June 6, 1953  
9 Claims. (Cl. 137—492)

The invention relates to relief valves for hydraulic systems and more particularly to servo-control relief valves.

One object of the invention is to provide an improved relief valve of the above general character adapted to respond with equal promptness and certainty at any rate of pressure rise between a very slow rate and a very rapid rate.

Another object is to provide a relief valve of large volumetric capacity in which the pressure difference across the valve when opened varies relatively little as between a low rate and a high rate of discharge.

Another object is to provide a relief valve which responds rapidly to pressure changes but which is substantially free of any tendency to hunt or oscillate.

Another object is to provide a servo-controlled relief valve of simple construction in which the servo pressure is derived through a pressure responsive servo-control or master valve from the source of fluid guarded by the relief valve.

Still another object is to provide a relief valve of the above type constructed and arranged so that it opens upon interruption or failure of servo pressure or, in other words, "fails to safety."

A further object is to provide a relief valve of the above type adapted to be controlled by a plurality of servo-control or master valves capable of being set for operation at different pressures thereby adapting the valve for use with hydraulic machines having more than one actuator or having a double acting piston and cylinder actuator requiring different pressures for execution of different motions of the machine.

It is also an object of the invention to provide a relief valve of simple construction in which the principal force tending to maintain the valve closed against pressure is provided by a predetermined volume of liquid under pressure acting as a spring whereby the rate of the relief valve is in large part determined by the volume of the liquid and the rate at which it is supplied to the relief valve under control of a servo-valve.

Other objects and advantages of the invention will become apparent from the following detailed description of the preferred embodiment illustrated in the accompanying drawings, in which:

FIGURE 1 is a longitudinal sectional view of a relief valve embodying the features of the invention.

FIG. 2 is a longitudinal sectional view of a pressure responsive servo-control or master valve adapted for cooperation with the valve shown in FIG. 1.

FIG. 3 is a diagrammatic view of a hydraulic system showing one way of incorporating the improved relief and master valves therein.

FIG. 4 is a fragmentary sectional view of the master valve showing the plunger in an intermediate position.

FIG. 5 is a fragmentary sectional view similar to FIG. 4 showing the valve plunger in fully operated or "overrun" position.

While a preferred form of the relief valve and master valve has been shown and their incorporation in one type of hydraulic system has been illustrated, it is to be understood that this is not intended to limit the invention to the particular construction or the environment shown. On the contrary, the intention is to cover all equivalents, modifications and adaptations falling within the spirit and scope of the invention as expressed in the appended claims.

By way of illustration, the invention has been shown as embodied in a relief valve 10 (FIGS. 1 and 3) of the packingless piston type operative to control an outlet for the escape of operating fluid from a pressure supply line through which fluid under pressure is delivered to an actuator or actuators. Extreme compactness for its volumetric capacity is obtained by utilization of what may be termed a liquid spring for opposing the pressure tending to open the relief valve. This makes it possible to apply a spring force to the valve of much larger spring rate of deflection than would be practical or convenient with a conventional coil spring. Moreover, the liquid spring has less inertia than a conventional spring and its force is readily adjustable by a master valve so that the relief valve can respond more rapidly and with substantially equal facility to pressure rises at any rate from very slow to very fast.

The improved relief valve 10 is servo-controlled, that is, it operates in conjunction with one or more pressure responsive servo-control or master valves 11 (FIGS. 2 and 3). By reason of the novel construction and relationship of the valves, pressure differences across the relief valve when it is blowing are maintained within very close limits regardless of whether the discharge through the relief valve is at a high rate or a low rate. Furthermore, the unique relationship between the valves permits the relief valve to blow at different maximum pressures depending upon the particular one of a plurality of master valves selected for control.

Referring more particularly to FIGS. 1 and 3 of the drawings, the relief valve 10 in its preferred form comprises a casing constructed, in this instance, of three sections, 12, 13 and 14, assembled in end-to-end relation and rigidly secured together in any suitable manner. Sealing rings 15 prevent leakage of fluid through the joints between the sections. In the particular valve shown, the intermediate casing section 12 is formed with a cylindrical bore 16 for the reception of a bushing 17 which, in turn, has a central cylindrical bore 18. The latter bore is dimensioned to receive with a close sliding fit a packingless plunger 20 constituting the movable member of the valve.

The inlet port for the valve 10 is formed by a bore 21 in the lower casing section 13 alined with the bore 18, as shown. Plunger 20 controls communication between this inlet port and an outlet port 22 which opens from an annular chamber 23 formed between the bushing 17 and the wall of the bore 16 and connecting with the bore 18 through a series of radially disposed passages 24. The lower end of the plunger is exposed to the pressure obtaining at the inlet port which tends to shift the plunger upwardly to uncover the passages 24 and thus establish communication with the outlet port for discharge of pressurized fluid.

The upper casing section 14 is formed with a bore 26 into which the upper end of the plunger 20 projects. The bore 26 defines a spring chamber 28 closed except for a port 29 through which pressure fluid may be introduced to apply a force to the upper end of the plunger in opposition to the force tending to open the valve. Provision is made for trapping fluid in the chamber 28 to enable it to function as a liquid spring and yieldably resist movement of the valve plunger to open position. As a relatively large volume of liquid is required to provide the necessary resiliency for such spring action, the chamber 28 is preferably connected with an auxiliary chamber or vessel 30 (FIG. 3) which, together, have sufficient cubic capacity to accommodate the required quantity of liquid. This permits the valve to be made small and compact. In the system illustrated, connection with the vessel 30 is effected through the medium of a conduit 31 connected to the port 29.

Novel means is provided for utilizing the fluid in the chamber 28 for damping the movements of the plunger 20 to substantially eliminate or reduce any tendency of the plunger to oscillate or hunt in the operation of the valve. This means includes an annular washer 34, mounted on the upper end of the plunger and fitted in the bore 26 to act as a piston element. The washer 34 is confined between two abutments on the plunger spaced apart so as to permit limited movement of the washer relative to the plunger as the latter executes its opening and closing movements. One of the abutments, in this instance the lower one, is formed by a flangelike enlargement 35 on the plunger having its marginal edge formed with radial slots 36 extending inwardly beyond the inner edge of the washer. The enlargement may also carry a series of springs 37 positioned to hold the washer out of direct contact therewith. The other or upper abutment is formed by an anular bushing 38 mounted on the reduced upper end portion of the plunger and held in place thereon by a nut 39.

With the above construction, upward movement of the valve plunger 20 toward open position is substantially unimpeded as fluid can flow freely around the washer 34 and through the slots 36. Downward or closing movement of the plunger is restrained or damped as the engagement of the bushing 38 with the upper face of the washer closes the passage through the interior of the washer and thus restricts flow to the space between the edge of the washer and the wall of the bore.

Movement of the valve plunger 20 to closed position in the absence of pressure in the system is effected by a light compression spring 40. This spring is interposed between the bushing 38 on the plunger and a washer 41 bearing against the closed upper end of the bore 28. A stop screw 42 threaded through the end of the casing section 14 and extending through the washer 41 provides an adjustable stop for limiting upward movement of the plunger.

The pressure responsive master valve 11, shown in FIG. 3, represents a preferred type of valve for controlling the relief valve 10 by regulating the supply of pressure fluid to the spring chamber 28 and serving to trap the fluid in the chamber or connected pressure vessel. In the preferred form illustrated, the master valve comprises a casing including three sections, 45, 46 and 47, assembled in end-to-end relation and rigidly secured together in any suitable manner. Intermediate casing section 45 has a central bore 48 fitted with a bushing 50 also formed with a central bore 51. The latter bore is cylindrical and is dimensioned to receive with a close sliding fit a packingless plunger 52 constituting the movable member of the valve.

The bushing 50 of the exemplary valve is formed with three external circumferential grooves 53, 54 and 55, respectively communicating with the bore 51 by way of radial passages 56, 57 and 58. Each of the grooves also opens through a port in the casing section 45 through which connections are made to associated elements of the hydraulic system in which the valve is incorporated. Thus, the groove 53 opens into a port 60, groove 54 opens into a port 61 and groove 55 opens into a port 62. When used with the relief valve 10, the port 60 constitutes the pressure fluid inlet port and is connected by a conduit 63 with the primary source of pressure fluid, that is the source guided by the relief valve 10. Port 61 is connected by a conduit 64 with the relief valve spring chamber 28, in this instance, by way of the auxiliary pressure vessel 30. Port 62 is an exhaust port and is connected by a drain conduit 65 with the sump or reservoir R which stores the fluid used in the hydraulic system.

Valve plunger 52 controls communication between the several ports of the valve as it is shifted axially along the bore 51. In the particular valve illustrated, the plunger 52 has an intermediate portion 66 of reduced diameter located and dimensioned so as to establish communcation between ports 60 and 61 when the plunger is in its fully retracted or normal rest position, as shown in FIG. 2. Upon movement of the plunger to the intermediate position shown in FIG. 4, communication between the ports 60 and 61 is interrupted. Further movement of the plunger toward its fully operated or overrun position, shown in FIG. 5, establishes communication between ports 61 and 62.

To provide the proper flow rate of fluid to and from the relief valve spring chamber 28, the master valve plunger 52 is constructed so that in addition to its valving action, it is enabled to function as a choke; that is, to restrict the rate of fluid flow through the valve. For this purpose the reduced portion 66 of the plunger is formed in steps of different diameter effective when in registry with the passages leading to the valve ports to variably determine the effective flow area in accordance with the position of the plunger. Thus, the lower end of the reduced portion 66 has a section 66a of only slightly smaller diameter than the plunger and another section 66b of slightly smaller diameter than the first mentioned section. The section 66b is in registry with the passages 56 leading from the pressure inlet port 60 and determines the flow rate therethrough when the plunger is in the normal rest position shown in FIG. 1. As the plunger is shifted upwardly, plunger section 66a is carried into registry with the passages 56 to progressively restrict the flow rate between the ports 60 and 61 until the flow is completely interrupted as the plunger reaches the intermediate position shown in FIG. 4.

At its upper end, the reduced portion 66 of the plunger has a section 66c slightly smaller in diameter than the plunger. As the plunger is shifted upwardly toward the position shown in FIG. 5, the connection between the ports 62 and 61 is progressively opened. The flow restrictions above discussed are important factors in controlling the operation of the relief valve as will appear presently in the detailed description of the operation of the valves.

The master valve plunger 52 is biased to a retracted or normally open position by a heavy coil spring 69 housed in a spring chamber 70 formed in the upper casing section 47. This spring chamber is vented through a port 71 and drain conduit 71a to drain off pressure fluid leaking into the chamber around the valve plunger. Spring 69 at is lower end bears against a disc-shaped abutment member 72 formed on its underside with a self-centering conical bearing seat 73 for engagement with the tapered upper end of the valve plunger. At its upper end, the spring 69 bears against the flangelike rim of a cup-shaped abutment member 74 which, in turn, engages the tapered head of an adjustable stop 75, herein shown as screw threaded through the upper end wall of the casing section 47. A suitable actuating element 76 is splined or otherwise non-rotatably attached to the projecting end of the stop for convenience in screwing it in or out to adjust the force applied to the valve plunger.

The valve plunger is adapted to be shifted to operated position against the action of the spring 69 by fluid pressure acting on its lower end. For this purpose, the lower casing section 46 is formed with a recess 77 for receiving the end of the plunger and to which fluid under pressure is supplied by way of a port 78 and conduit 79. The plunger is desirably formed with a head 80 of greater diameter than the bore 51 to limit its upward movement. An adjustable stop screw 81 threaded through the casing section 46 coacts with the lower end of the plunger to determine its lower limit position when retracted.

To illustrate their novel mode of operation, the relief valve 10 and the master valve 11 have been shown incorporated in a typical hydraulic system such as is used in machine tools, hydraulic presses and comparable machines. In the exemplary system, fluid under pressure is supplied by a pump P through a primary pressure supply conduit 82 to a hydraulic actuator 83, herein shown as a double-acting cylinder and piston actuator. It is to be understood that the valves may be used with other types of actuators and with one or any number of actuators if desired. As shown, the pressure fluid supplied to the actuator is controlled by a conventional direction valve V connected with opposite ends of the actuator cylinder by conduits 84 and 85 and adapted to be set selectively to connect the supply conduit to either of the branch conduits while connecting the other branch conduit to a drain conduit 86 for returning spent pressure fluid to the sump R. In the exemplary system, inlet port 21 of the relief valve 10 is connected by a branch conduit 87 with the primary pressure supply conduit 82. The lower end of the valve plunger 20 is accordingly subjected to primary pressure tending to shift the plunger to open position. In the open position of the plunger, fluid entering through the inlet port 21 is diverted to the sump by way of exhaust port 22 and a drain conduit 88.

Conduits 63 and 79 connect the master valve 11 with the primary pressure supply conduit 82, as shown. Valve plunger 52 thus has its lower end exposed to primary pressure tending to shift it to operated position against the force exerted by spring 69. As long as the valve plunger is in its normal rest position, primary fluid supplied by way of conduit 63 is directed through conduit 64 to the auxiliary vessel 30 and the spring chamber 28 of the relief valve 10. (For present purposes and assuming that the direction valve V is set to direct fluid to the upper end of the actuating cylinder by way of the branch conduit 84, the connection of second master valve 11' between the valve 11 and vessel 30 may be ignored as the valve 11' is open and in effect merely provides a channel or passage for the flow of pressure fluid.)

In placing the system in operation, the master valve 11 is preset for a predetermined maximum operating pressure, that is, the spring 69 is adjusted so that the plunger 52 will be shifted to interrupt the flow of pressure fluid to the spring chamber 28 when the primary pressure reaches the desired maximum value. When the master valve is open, primary fluid is diverted to the liquid spring chamber at a restricted rate, as explained above. This rate is determined by the choking action of the master valve which is constructed so as to bleed in sufficient fluid to keep the relief valve hydraulically balanced as long as the rate of pressure rise remains below a predetermined critical value. Accordingly, as long as the primary pressure remains below the preset maximum and the rate of pressure rise does not exceed the critical value, substantially the same hydraulic pressure is maintained on opposite ends of the relief valve plunger 20. As the effective areas of the plunger ends are substantially equal, the light spring 40 maintains the relief valve closed under such conditions and primary pressure fluid is delivered to the actuator cylinder 83.

When the primary pressure rises to the maximum preset value, as when the actuator completes its stroke, master valve plunger 52 is shifted to a position to interrupt the flow of pressure fluid to the spring chamber 28 and to trap the fluid in the chamber and the auxiliary vessel 30 connected thereto. If the primary pressure continues to rise, the pressure exerted on the lower end of the relief valve plunger shifts the plunger in a direction to compress the trapped fluid and open the exhaust port. As explained before, the vessel 30 and the spring chamber 28 together have sufficient volumetric capacity to accommodate a volume of pressure fluid having the necessary resiliency to permit movement of the valve plunger to open position by a relatively small increase in pressure compared with the preset maximum value. Opening of the relief port diverts a sufficient volume of fluid to prevent further rise of primary pressure. As the liquid spring has no inertia, the valve responds rapidly to pressure changes and thus maintains precise control over the pressure of the operating fluid. At the same time, hunting or oscillating of the valve plunger is prevented by the damping means provided on the plunger.

Simultaneously with the movement of the relief valve plunger to open position, as above explained, the master valve plunger is advanced a little farther, but as long as the relief valve is blowing at a constant flow, the master valve plunger takes up a position covering both ports 60 and 61 so that "leakage" to the spring chamber 28 exactly balances "leakage" out of the chamber.

Under some conditions primary pressure may rise faster than the critical rate before the preset maximum pressure is reached. Under such conditions, the relief valve should blow off at a pressure substantially below the preset maximum. The improved valve is adapted to operate in that manner for the reason that the master valve 11 restricts flow of fluid to the spring chamber and thus establishes a pressure differential on the relief valve plunger such that it moves immediately into open position. Primary pressure will continue to rise, however, because fluid is still directed through the master valve to the spring chamber thus gradually raising pressure of the liquid spring. Eventually the pressure rise will move the master valve plunger to closed position and interrupt further rise of the liquid spring pressure and thereafter the relief valve will blow off at a constant pressure.

A further advantage obtained through the novel co-action of the relief and master valves above described is their ability to maintain the pressure drop across the relief valve 10 substantially uniform regardless of the rate of flow through the valve. Assume, for example, that the relief valve is blowing at a certain flow rate and a given primary pressure. If the flow rate is now increased, the primary pressure will rise due to the jet effect which tends to close the valve in opposition to the flow. Primary pressure accordingly increases and this increase serves to move the master valve plunger 52 into a position to increase the leakage from the spring chamber. This reduces the force exerted by the liquid spring and brings about a drop in primary pressure until the master valve regains its position of stability upon re-establishment of the preset maximum pressure. Thus the valves co-operate to maintain the primary pressure within very close limits and to enable the relief valve to respond uniformly at any flow rate from very slow to very fast.

The improved relief valve 10 lends itself readily to control by more than one master valve, each preset for a different maximum operating pressure. Thus, a plurality of actuators or different motions of a double-acting actuator may be operated to exert different pressures under control of a common relief valve. A hydraulic circuit in which two master valves, 11 and 11', precisely like the valve 11 heretofore described, are associated with a double acting hydraulic actuator, is shown in FIG. 3.

Referring to the drawing, the first valve 11 which is preset for the highest maximum operating pressure required, has its operating pressure port 78 and its inlet port 60 connected to the primary pressure supply conduit 82 by the branch conduits 79 and 63, respectively. Outlet port 61 of the first valve is connected by the conduit 64 with the inlet port 60 of the second valve 11'.

The second or lower pressure valve 11' has its operating pressure port 78 connected by a branch conduit 79' with the supply conduit for the second actuator, in this instance, the branch conduit 85 leading to the lower end of the actuator cylinder 83.

When the direction valve V is set to direct pressure fluid through the branch conduit 84 to the upper end of the actuator cylinder, branch conduit 85 is connected to exhaust. Due to the absence of pressure in the conduit 85 and the branch conduit 79' connected thereto, valve 11' remains inactive, that is, its plunger is held in normal rest position providing a passage between the inlet and outlet ports 61 and 60 so that valve 11 can function precisely as described heretofore.

Shifting of the direction valve V to direct pressure fluid through the conduit 85 to the lower end of the actuator cylinder simultaneously connects conduit 84 to exhaust. Operating pressure is then supplied through the conduit 79' to the master valve 11' which operates in precisely the same manner as previously described for the valve 11. Since the valve 11' is preset for a lower maximum operating pressure than the companion master valve 11, it will of course perform its valving functions before the primary pressure rises sufficiently to actuate the valve 11. Thus, the relief valve 10 is enabled to control the maximum pressure supplied to both actuators under control of the two preset master valves.

It will be apparent from the foregoing that the invention provides a relief and master valve arrangement of novel and improved construction. Through the coaction of those valves, it is possible to provide a relief valve of large volumetric capacity adapted to maintain pressure differences across the valve within very close limits regardless of the rate of discharge. By use of a novel liquid spring, the relief valve is enabled to respond very rapidly to pressure changes but without hunting or oscillation. The use of the liquid spring also provides a much more compact valve structure than is possible with a conventional spring. Furthermore, with the improved valve arrangement, a single relief valve is enabled to control the operating pressure supplied to a plurality of actuators operating in conjunction with a like plurality of simple master valves.

We claim as our invention:

1. The combination with a relief valve having a plunger controlling communication between a fluid inlet port and an outlet port and having one end extending into a closed chamber, said plunger having substantially equal areas exposed to the pressure prevailing in said chamber and at said inlet port, a relatively light spring urging said plunger to closed position, a source of fluid under pressure, conduit means connecting said fluid source with said inlet port and said chamber so as to maintain the fluid pressure at opposite ends substantially in balance, and pressure responsive means controlling the delivery of fluid to said chamber operative upon a predetermined rise in pressure to trap the fluid in said chamber and thereby establish a bias on said plunger effective to maintain the pressure drop across the inlet and outlet ports substantially uniform in all open positions of the plunger.

2. The combination with a relief valve having a plunger controlling communication between a fluid inlet port and an outlet port and having one end extending into a closed chamber, said plunger having substantially equal areas respectively exposed to the pressure prevailing in said chamber and at said inlet port, a spring in said chamber urging said plunger in a direction to close said outlet port from said inlet port, a source of fluid under pressure, conduit means connecting said fluid source to said inlet port, other conduit means connecting said fluid source to said chamber, and pressure responsive valve means in said other conduit means operative upon a pressure rise to a predetermined value to shut off flow of fluid to the chamber and to trap previously supplied fluid in the chamber for maintaining a selected bias on the plunger toward the closed position.

3. The combination with a valve having a bore, a plunger reciprocable in said bore and controlling communication between an inlet port and an outlet port, spring means acting on one end of the plunger urging it to a position to close said inlet port from said outlet port, means defining a closed chamber at the end of said bore remote from the inlet port, said plunger having an area at said one end exposed to the pressure prevailing in said chamber and an area at the other end exposed to the pressure prevailing at the inlet port, a closed auxiliary chamber connected to said first mentioned chamber, connections for delivering pressure fluid from a common source to the inlet port and to said chambers, and pressure responsive valve means operative when the pressure rises to a predetermined value to close the connections to said chambers and thereby trap the pressurized fluid therein, said chambers having a volumetric capacity such that the trapped fluid may be compressed sufficiently to allow the plunger to move to open position when the pressure at the inlet port rises to a predetermined maximum value.

4. The combination with a relief valve comprising a casing defining a bore with an outlet port opening into it intermediate the ends of the bore, one end of said bore constituting an inlet port for fluid under pressure, a plunger reciprocable in said bore to control communication between said inlet and outlet ports, a casing extension defining a chamber opening into the other end of the bore, spring means in said chamber acting on said plunger to urge it toward a closed position against the pressure exerted on the plunger by the fluid at said inlet port, means for introducing fluid under pressure into said chamber to supplement the force exerted on the plunger by said spring means, and pressure operated means for sealing the fluid in the chamber, said chamber having a volumetric capacity sufficiently large to permit movement of the plunger to open position by compression of the fluid sealed in the chamber.

5. A valve combination as defined in claim 3 in which the valve means operative to close the connections to the valve and auxiliary chambers when system pressure rises to a predetermined value is also operative at pressures below said predetermined value to restrict the flow of fluid to the chambers so as to produce an unbalance of pressure on opposite ends of the valve plunger when the rate of pressure rise exceeds a predetermined rate.

6. A valve combination as defined in claim 4 in which valve means is provided for restricting the flow of fluid into the chamber to a rate such that the pressure on the opposite ends of the valve plunger is maintained substantially equal as long as the rate of pressure rise at the inlet port remains below a predetermined value.

7. A valve combination as defined in claim 4 in which valve means is provided for restricting the flow of fluid to the chamber to a rate such that when the rate of pressure rise at the inlet port exceeds a predetermined value, pressure on the ends of the valve plunger is unbalanced to permit the plunger to move toward open position and vent fluid through the outlet port until balanced forces on the plunger are restored.

8. A valve combination as defined in claim 3 in which the end of the valve plunger exposed to pressure in the chamber is extended to project into the chamber and to define a circumferential groove, a ring element seated in said groove and having a substantially sealing fit with the walls of the chamber, said ring element being substantially thinner than the width of the groove and effective to cooperate with the opposite walls of the groove as the plunger reciprocates in the bore, the portion of the plunger adjacent one of the walls being slotted to permit substantially unrestricted flow of fluid around the ring when the plunger is moving in a direction to bring the ring in coacting relationship with said one wall.

9. A valve combination as defined in claim 3 in which the end of the valve plunger exposed to pressure in the chamber is extended to project into the chamber, a damping washer mounted on the projecting end of the plunger for reciprocating with it and for limited movement axially thereof and having its marginal edges cooperating with the walls of the chamber, spaced abutments on the plunger alternately engageable with the washer in the reciprocation of the plunger, said washer being operative when in engagement with one of the abutments to substantially restrict the flow of fluid from one end of the chamber to the other while permitting substantially unrestricted flow when in engagement with the other abutment.

References Cited in the file of this patent

UNITED STATES PATENTS

| | | | |
|---|---|---|---|
| 527,575 | Wood | Oct. 16, | 1894 |
| 868,030 | Tanner | Oct. 15, | 1907 |
| 1,110,567 | McAulay | Sept. 15, | 1914 |
| 1,291,609 | Nichols | Jan. 14, | 1919 |
| 1,631,142 | Masters | June 7, | 1927 |
| 1,850,117 | McMillan | Mar. 22, | 1932 |
| 2,375,410 | Gondew et al. | May 8, | 1945 |
| 2,404,102 | Schultz | July 16, | 1946 |
| 2,500,555 | Majneri | Mar. 14, | 1950 |
| 2,545,573 | Fletcher | Mar. 20, | 1951 |
| 2,617,389 | Munschauer | Nov. 11, | 1952 |
| 2,624,361 | Brown | Jan. 6, | 1953 |
| 2,639,725 | Albright | May 26, | 1953 |

UNITED STATES PATENT OFFICE
CERTIFICATE OF CORRECTION

Patent No. 2,993,505                            July 25, 1961

Frank Hathorn Towler et al.

It is hereby certified that error appears in the above numbered patent requiring correction and that the said Letters Patent should read as corrected below.

Column 4, line 53, for "is" read -- its --; column 10, line 5, for "Gondew et al." read -- Gondek et al. --; same column 10, after line 11, of the list of references cited, add the following:

1,319,006     Kimball------Oct. 14, 1919
         1,846,483     Gilbert------Feb. 23, 1932
         2,002,451     Gray---------May 21, 1935
         2,745,429     Crookston---May 15, 1956

Signed and sealed this 9th day of January 1962.

(SEAL)
Attest:

ERNEST W. SWIDER                             DAVID L. LADD
Attesting Officer                         Commissioner of Patents